Patented May 31, 1938

2,119,079

UNITED STATES PATENT OFFICE 2,119,079

MANUFACTURE OF ALKYL HALIDES

Thomas Kane, Holborn, London, England, assignor to Edward Halford Strange, London, England No Drawing. Application February 13, 1934, Serial No. 711,073. In Great Britain February 13, 1933

10 Claims. (Cl. 260—166)

This invention relates to improvements in the manufacture of alkyl chlorides and/or alkyl bromides (hereinafter termed "alkyl halides") by reacting olefines having from three to seven carbon atoms to the molecule or gaseous or vapourized mixtures of such olefines with other gases or vapours (hereinafter termed "olefines") with hydrogen chloride and/or hydrogen bromide (hereinafter termed "hydrogen halide") in presence of a contact mass comprising or embodying adsorbent. The contact mass must be sufficiently resistant to the action of the hydrogen halide and suitable adsorbents are in general solids having a microporous structure and having the property of condensing gases.

Hitherto in carrying out such processes the method adopted has been either to conduct the process at a relatively high temperature so that approximately continuous working is attained by reason of the volatile products passing from the reaction mass in the form of gas or vapour, or it has been carried out as a batch process when a lower temperature can be employed and the product removed from the saturated adsorbent by such a method as steam distillation.

An objection to the first method is the progressive deterioration of the adsorbent through the production of polymers, condensation products, and other products, as a result of the relatively high temperature necessarily employed.

Objections to the second method are the difficulty of removing the product by applying heat to the adsorbent owing to its low power of conducting heat, and the fact that if steam distillation is employed this causes deterioration of the adsorbent and reactivation is essential after its use for each batch.

The improved method in accordance with the present invention consists in bringing about the reaction between the olefines and hydrogen halide at a temperature below the boiling point of the resulting product under the particular reaction conditions, and in utilizing the heat generated as a result of the exothermic nature of the reaction, and also that due to adsorption to distil off the product from the contact mass by reducing the pressure. The particular reaction conditions referred to include those due to the presence of an excess of adsorbent, to the rate of addition of gas, to the concentration of olefines, and also to the pressure in the reaction chamber. The reaction can be carried out at atmospheric pressure, and the temperature should be low enough to ensure that the production of undesirable by-products is negligible. It is found that owing to the small heat capacity of most adsorbent materials, it is generally necessary for the adsorbent to be employed in intimate association with an inert or relatively inert material having a high heat capacity to retain the heat of adsorption and the heat of formation of the product. When a sufficient amount of heat has been generated in the contact mass, subject to the conditions stated above, so as to be capable of distilling off the product under reduced pressure, the supply of raw materials is cut off and vacuum applied. The product is then removed without the necessity of applying external heat and no steam is required. As a result the contact mass after removal of the product is immediately ready for use in bringing about the combination of more raw materials without any further process of purification or reactivation being necessary for an extended period. The amount of raw materials converted in any one reaction is determined by the upper limit to which the temperature is permitted to rise before the supply of raw materials is cut off.

In addition to adsorbent and heat retaining substance the contact mass employed may contain chemically active agents such as zinc chloride, stannic chloride, or aluminium chloride.

In cases where an excess of hydrogen halide is present or free acid results, provision after the reaction vessel of a further vessel containing a basic material may be desirable.

The supply of raw materials may be automatically cut off and pressure reduction effected at the right moment and vice versa by the employment of thermostatically operated controls.

In carrying out the process according to this invention the adsorbent material may be mixed with or distributed over or throughout an inert or relatively inert material having a high heat retaining capacity and preferably good heat conductivity. Adsorbents of the most active kinds such as silica gel, hydrous aluminium oxide, and activated carbon, either pure or impregnated with other metallic catalysts, are preferably mixed with a metal resistant to the action of dry hydrochloric acid or granular silica, siliceous brick, sintered aluminia or similar material in order to provide a means of absorbing the heat of adsorption and reaction, whilst at the same time providing a reserve of heat that remains available for distillation of the alkyl chloride under reduced pressure.

Example

Into a well heat-insulated iron vessel capable of withstanding the action of dry hydrochloric acid and strong enough to be evacuated and provided with suitable connections for the addition of the reagents and removal of the products, is placed—

1 part of an adsorbent consisting of an intimate mixture of silica gel and hydrous aluminium oxide made by double decomposition in the well known manner and which has been partially dehydrated by heating to a temperature of 250° C. for two or more hours, mixed with 2 parts of iron metal which may be in the form of turnings, grains, rods or any convenient form having a large surface area so that a uniform distribution of adsorbent and metal is obtained.

A mixture of approximately equal volumes of dry propylene and dry hydrochloric acid is passed into the vessel at a rate equal to the rate of adsorption and combination. The addition is continued until the average temperature of the contact mass has reached from 80° C. to 120° C. when further addition is discontinued and the propyl chloride which has been formed and is contained in the adsorbent is recovered by connection of the reaction chamber to vacuum. The propyl chloride which is thus removed is condensed by pressure and/or cooling at the delivery side of the pump. During the removal of the chloride the heat stored in the iron filling becomes transferred to the propyl chloride and causes the vaporization thereof. The temperature of the whole mass is thereby reduced, and when it has fallen sufficiently, say to 40° C., the distillation is stopped and a fresh supply of propylene and hydrochloric acid is admitted. When the temperature has again reached the selected upper limit the gas supply is stopped and recovery by vacuum repeated. This cycle of operations may be conducted a great number of times and the yield of alkyl chloride may amount to 14% of the weight of the catalyst for each cycle.

The relative proportions of adsorbent and heat retaining substance stated in this example are capable of variation within comparatively wide limits. It is probable, however, that with the materials specified, equal parts represent a lower limit for the quantity of heat retaining substance which can be successfully employed in practice. Generally speaking the greater the relative amount of heat retaining substance used the lower will be the final equilibrium temperature which it is possible for the contact mass to attain. This leads to an increased concentration of the product in the adsorbent but the comparatively low temperature results in a slower distillation when vacuum is applied. It is not normally worth while to attempt by the proposed vacuum distillation method to reduce the ultimate concentration of the product in the adsorbent to less than 3% before fresh raw materials are passed in.

When the activity of the catalyst has fallen below practical limits it may be regenerated by heating to a temperature of about 250° C. by blowing a stream of heated air through the reaction vessel. The small quantities of by-products that clog the pores of the catalyst are thus removed and after cooling the original cycle of operations may be repeated.

In place of the adsorbent described, adsorbent bauxite, natural or artificial adsorbent zeolites, iron oxide gel, or similar hydrous oxide gels may be used without serious departure from the conditions stated and quantities given in the example. Also the metallic iron may be replaced by silica, brick or alundum, or similar inert materials for storing the heat generated.

Instead of propylene we may use butylene, anylene, or hexylene, or mixtures of any of these olefines, or of these olefines with gases of an unreactive nature under the conditions of the example. In the case of the higher olefines the reaction temperature may be allowed to reach 150° C. without serious loss of efficiency.

Hydrobromic acid may replace hydrochloric acid, and the alkyl bromides produced may be recovered in exactly the same manner as the chlorides.

When olefines admixed with other gases are used, a small proportion of the alkyl halides is removed with the effluent gases and may be recovered therefrom.

The process in accordance with the invention is also applicable to the reaction between ethylene and hydrobromic acid.

I claim as my invention:

1. A batch process for the manufacture of alkyl halides consisting in reacting a hydro-acid of the halogens other than fluorine and iodine, and an olefine with from 3 to 7 carbon atoms in the molecule in the presence of a contact mass essentially including solid porous adsorbent in association with a solid material having a relatively high heat capacity with relation to the heat capacity of the contact mass at a temperature below the boiling point of the resulting product, then reducing the pressure and utilizing heat generated by the reaction to distil the product from the contact mass under the reduced pressure without application of external heat.

2. A process for the manufacture of alkyl halides according to claim 1, wherein the contact mass employed embodies a solid porous adsorbent of the most active kind selected from the group consisting of silica gel, hydrous aluminium oxide, activated carbon, adsorbent bauxite, natural and artificial adsorbent zeolites, iron oxide and similar hydrous oxide gels, admixed with a material of high heat capacity selected from the group consisting of metal resistant to the action of dry hydrogen halide under the conditions of the reaction, granular silica, siliceous brick, alundum, and sintered alumina.

3. A process for the manufacture of alkyl halides according to claim 1, wherein the contact mass employed comprises adsorbent consisting of an intimate mixture of silica gel and hydrous aluminium oxide made by double decomposition and partially dehydrated by heating to a temperature of about 250° C. for two or more hours, in uniform admixture with at least an equal part of metallic iron.

4. A process for the manufacture of alkyl halides according to claim 1, wherein the reaction between the hydrogen halide and the olefine is carried out at substantially atmospheric pressure.

5. A process for the manufacture of propyl halides according to claim 1, wherein a mixture of dry propylene and dry hydrogen halide in approximately equal volumes is passed into the reaction vessel at a rate equal to that of adsorption and combination until the contact mass has risen to a temperature within the limits 80° to 120° C.

6. A process for the manufacture of alkyl halides containing from 4 to 7 carbon atoms in the molecule by the method according to claim 1 wherein a mixture of the appropriate olefine in the dry state and dry hydrogen halide in approximately equal volumes is passed into the reaction vessel at a rate equal to that of adsorption and combination until the contact mass has risen to a temperature not exceeding 150° C.

7. A process for the manufacture of alkyl halides according to claim 1, wherein the distillation of the product under reduced pressure is continued until the average temperature of the contact mass falls to approximately 40° C.

8. A process for the manufacture of alkyl halides according to claim 1, wherein the distillation of the product under reduced pressure is continued until the concentration of the product remaining in the contact mass has fallen to approximately 3% of the weight of adsorbent.

9. A process for the manufacture of alkyl halides according to claim 1, wherein the contact mass employed includes a solid porous absorbent of the most active kind selected from the group consisting of silica gel, hydrous aluminium oxide, activated carbon, absorbent bauxite, natural and artificial absorbent zeolites, iron oxide and similar hydrous oxide gels, impregnated with a catalyst of the group consisting of zinc chloride, stannic chloride and aluminium chloride.

10. The process for the manufacture of ethyl bromide consisting in reacting ethylene and hydrogen bromide in the presence of a contact mass including solid porous adsorbent in association with a solid material having a relatively high heat capacity with relation to the heat capacity of the contact mass, at a temperature below the boiling point of the resulting product, then reducing the pressure and utilizing heat generated by the reaction to distil the product from the contact mass under the reduced pressure without application of external heat.

THOMAS KANE.